(12) United States Patent
Chen

(10) Patent No.: US 7,395,995 B2
(45) Date of Patent: Jul. 8, 2008

(54) MONITOR SUPPORT STRUCTURE

(75) Inventor: Wen-Chun Chen, Tao Yuan (TW)

(73) Assignee: Hoolin Research Company Limited, Tao Yuan (TW)

( * ) Notice: Subject to any disclaimer, the term of this patent is extended or adjusted under 35 U.S.C. 154(b) by 168 days.

(21) Appl. No.: 11/488,677

(22) Filed: Jul. 19, 2006

(65) Prior Publication Data
US 2008/0029661 A1 Feb. 7, 2008

(51) Int. Cl.
*E04G 3/00* (2006.01)

(52) U.S. Cl. .................. 248/284.1; 248/291.1; 248/917

(58) Field of Classification Search ............. 248/284.1, 248/291.1, 917–923, 281.11, 280.11, 278.1
See application file for complete search history.

(56) References Cited
U.S. PATENT DOCUMENTS

| | | | | |
|---|---|---|---|---|
| 6,394,403 B1 * | 5/2002 | Hung | ....................... | 248/276.1 |
| 6,769,657 B1 * | 8/2004 | Huang | ..................... | 248/278.1 |
| 6,857,610 B1 * | 2/2005 | Conner et al. | ............ | 248/284.1 |
| 7,048,242 B2 * | 5/2006 | Oddsen, Jr. | ............ | 248/280.11 |
| 7,066,435 B2 * | 6/2006 | Oddsen et al. | ......... | 248/220.43 |
| 7,188,812 B2 * | 3/2007 | Wang | ..................... | 248/276.1 |
| 7,243,892 B2 * | 7/2007 | Pfister | ........................ | 248/371 |
| 7,246,780 B2 * | 7/2007 | Oddsen, Jr. | .............. | 248/282.1 |
| 7,289,315 B2 * | 10/2007 | Hillman et al. | ............. | 361/683 |

* cited by examiner

*Primary Examiner*—Amy J. Sterling
(74) *Attorney, Agent, or Firm*—Troxell Law Office, PLLC

(57) ABSTRACT

A monitor support structure generally comprises a clamping unit, a rotatable arm, a support arm, a pivotal connecting unit, a linking rod, and a shiftable unit. The clamping unit is provided for fixing so as to allow the monitor support structure to hold and support an article. The pivotal connecting unit allows the support arm to shift upward or downward for adjusting the tilt angle of the article. Besides, the elastic devices provide the elastic force for pulling the support arm downward so as to share the weight of the article. Moreover, the linking rod can balance the weight of the article for steadily supporting the article.

6 Claims, 8 Drawing Sheets

MONITOR SUPPORT STRUCTURE

FIELD OF THE INVENTION

The present invention relates to a monitor support structure for angle adjustment, and more particularly to a monitor support structure that provides the steady support effect and disperses the supported weight effectively.

BACKGROUND OF THE INVENTION

The monitor support structure must be angle-adjustable, frontward/backward adjustable, and leftward/rightward adjustable, besides providing the basic support function. With the gradual improvement in high-tech product, the traditional CRT monitor is gradually replaced by the LCD monitor. The LCD monitor has certain volume and weight even if it is thin and light and occupies smaller space. Therefore, the user must apply a certain amount of force for adjusting the angle of the support structure.

Furthermore, there exists a tendency to provide the LCD monitor with a bigger screen size, which makes the LCD monitor heavier. As a result, the purpose of the present invention is to provide a monitor support structure with better support torque and make it suitable for all view angles.

SUMMARY OF THE INVENTION

It is a main object of the present invention to provide a monitor support structure for adjusting the tilt angle of a LCD monitor. The elastic devices provide the elastic force for pulling the support arm downward so as to share the weight of the article. Besides, the linking rod can balance the weight of the article for steadily supporting the article.

DETAILED DESCRIPTION OF THE PREFERRED EMBODIMENT

Figure 1:
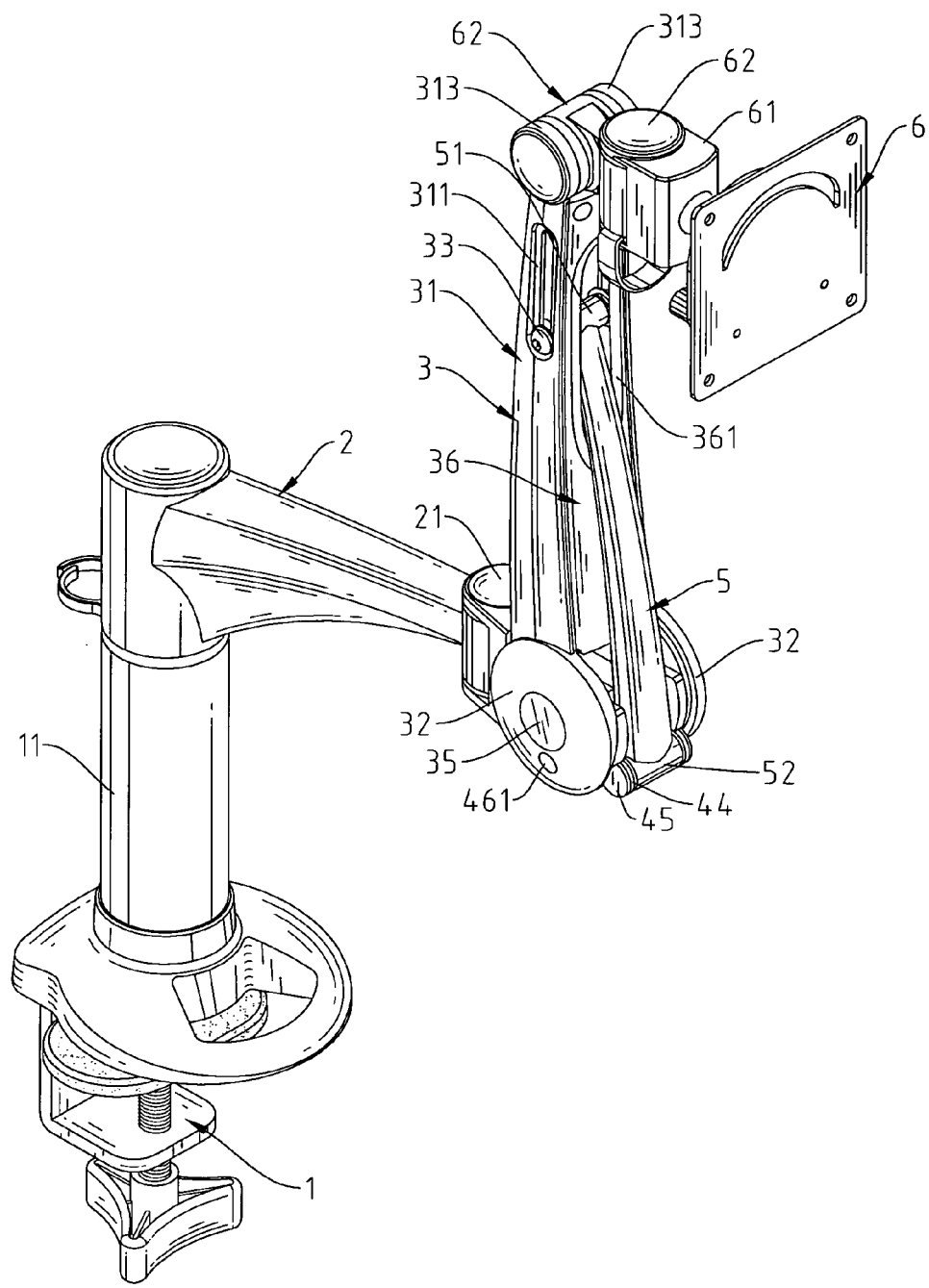
FIG. 1 is an elevational diagram of the present invention.

Referring to FIGS. 1, 2, 3, and 8, a monitor support structure of the present invention generally comprises a clamping unit 1, a rotatable arm 2, a support arm 3, a pivotal connecting unit 4, a linking rod 5, and a shiftable unit 6.

In the present invention, the clamping unit 1 can be fixed on a tabletop 7 so as to allow the monitor support structure, which is constructed of the clamping unit 1, the rotatable arm 2, the support arm 3, the pivotal connecting unit 4, the linking rod 5, and the shiftable unit 6, to hold and support a LCD monitor 8. The aforesaid clamping unit 1 has a support pillar 11 pivotally connecting to one end of the rotatable arm 2. The rotatable arm 2 is leftward and rightward rotatable. A pivot unit 21 is extended from the other end of the rotatable arm 2, and pivotally fixed between two bottom plates 43, which are located on one side of the pivotal connecting unit 4.

The pivotal connecting unit 4 has a shaft hole 41, a penetrated guide slot 42 for holding a shaft 46, a penetrated hole 48, and a pair of hooking ears 44 on the other side of the pivotal connecting unit 4. After penetration, the shaft 46 is sealed and fixed by a plug cover 461. Besides, the pivotal connecting unit 4 is connectedly assembled to the support arm 3.

The support arm 3 is a bar-shaped unit, and the support arm 3 is covered with a cover 36. The support arm 3 has a chamber for orderly holding, for example, signal and power cables of the LCD monitor 8. The support arm 3 has two clamping plates 32 bilaterally on the bottom for coupling with the pivotal connecting unit 4. The support arm 3 further has two lateral plates 31 having respective symmetric long slots 311 on the respective upper portions. The lateral plates 31 have respective fixing units 312 closely under respective long slots 311 for fixing respective first ends of a pair of elastic devices 47. One of the clamping plates 32, which is located on the bottom of the support arm 3, has a center hole 321, a pin hole 322, and several positioning holes 323 on the inner surface. In addition, the other clamping plate 32 has a center hole 321, a slotted hole 324, and several positioning holes 323 on the inner surface. A pair of friction devices 37 is disposed between the clamping plates 32 to touch the pivotal connecting unit 4, thereby avoiding the attrition between the support arm 3 and the pivotal connecting unit 4. Thus, the support arm 3 and the pivotal connecting unit 4 are smoothly pivotally rotatable. Each friction device 37 has a shaft hole 371, a pin hole 372, and several pins 373.

Referring to FIGS. 2 through 6, the assembly between the support arm 3 and the pivotal connecting unit 4 is shown. Each of the friction devices 37 is located between the clamping plate 32 and the pivotal connecting unit 4. The pins 373 of the friction device 37 can be inserted into and coupled with the positioning holes 323. The shaft hole 41 of the pivotal connecting unit 4, the center holes 321 of the clamping plates 32, and the shaft holes 371 of the friction devices 37 are penetrated through by a threaded rod 34. Next, a screw nut 341 is screwed onto the threaded rod 34 for pivotally fixing the pivotal connecting unit 4, the clamping plates 32, and the friction devices 37 together. The center hole 321 of each of the clamping plates 32 is covered with a coupling cover 35. The pin hole 322 of the clamping plate 32, the pin holes 372 of the friction devices 37, and the guide slot 42 of the pivotal connecting unit 4 are penetrated through by the shaft 46, wherein one end of the shaft 46 is held in the slotted hole 324 of one of the clamping plates 32. In addition, the other end of the shaft 46 is held in the pin hole 322 of the other clamping plate 32, and covered with the plug cover 461.

Besides, the penetrated hole 48 is formed on the pivotal connecting unit 4 above the shaft hole 41 for holding a shaft rod 49, wherein first ends of the elastic devices 47 are fixed respectively on the fixing units 312 of the lateral plates 31 and second ends of the elastic devices 47 are respectively fixed on the both ends of the shaft rod 49.

Moreover, the pivotal connecting unit 4 has the hooking ears 44 on rearward for holding a second shaft sleeve 52 that locates on one end of the linking rod 5. The second shaft sleeve 52 is fixed on the hooking ears 44 by shaft assemblies 45. The linking rod 5 has a first shaft sleeve 51 on the other end, wherein this first shaft sleeve 51 is held in the long slots 311 of the lateral plates 31 of the support arm 3 by respective screw assemblies 33. In addition, two elastic sheets 331 are disposed between the first shaft sleeve 51 and the long slots 311, respectively, for adjusting the tightness between the linking rod 5 and the screw assemblies 33 that screw thereon.

Two wing plates 313 are coupled with the respective upper ends of the respective lateral plates 31 of the support arm 3, and connected to a joint unit 62 that couples with a mounting frame 61 of the shiftable unit 6. The LCD monitor 8 is mounted on the shiftable unit 6 such that the LCD monitor 8 is leftward and rightward rotatable.

Figure 2:
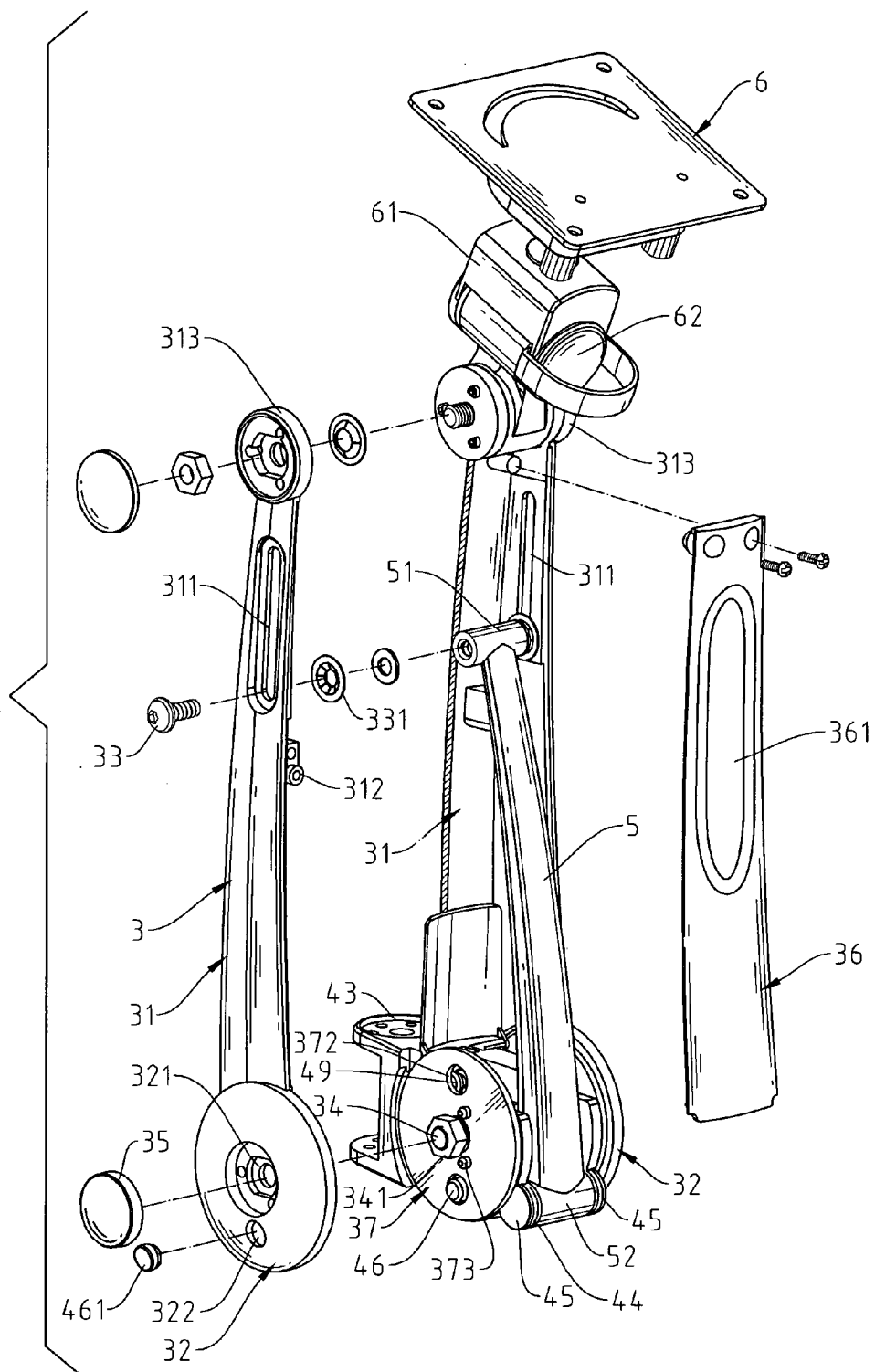
FIG. 2 is partially exploded diagram of present invention.
Figure 3:
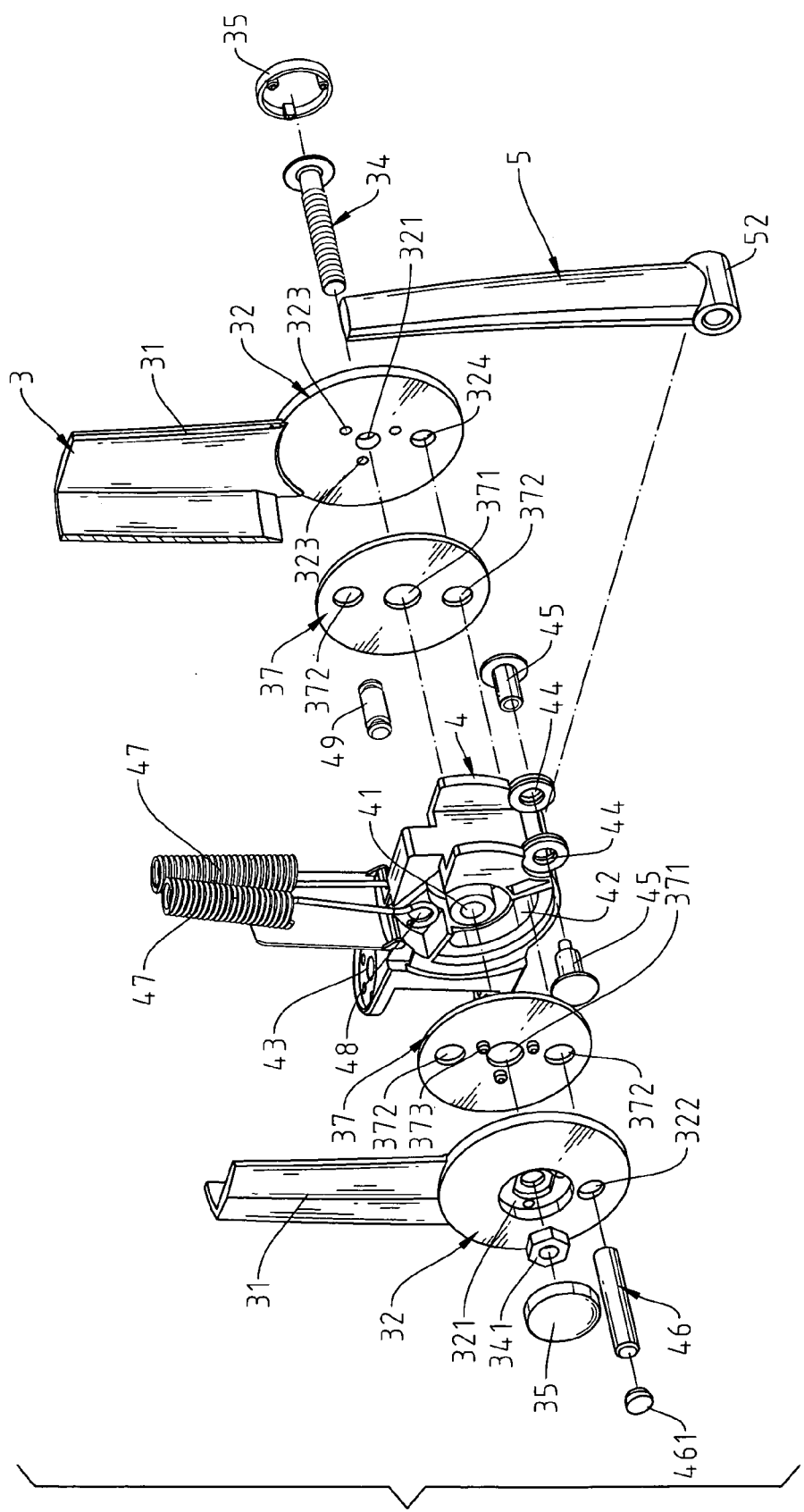
FIG. 3 is exploded diagram showing the support arm and pivotal connecting unit of the present invention.
Figure 4:
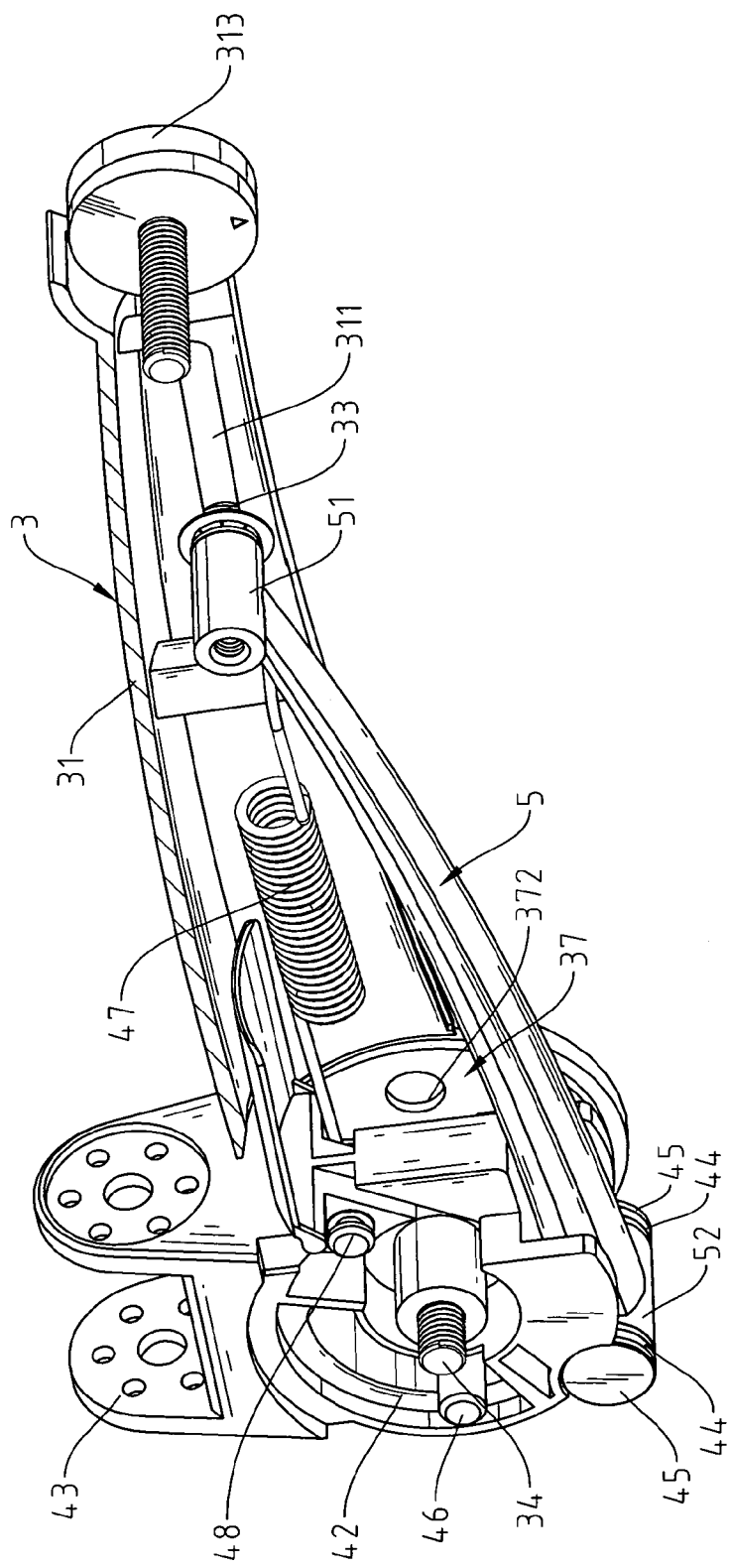
FIG. 4 is a first partially, perspective diagram showing the assembled pivotal connecting unit and support arm of the present invention.
Figure 5:
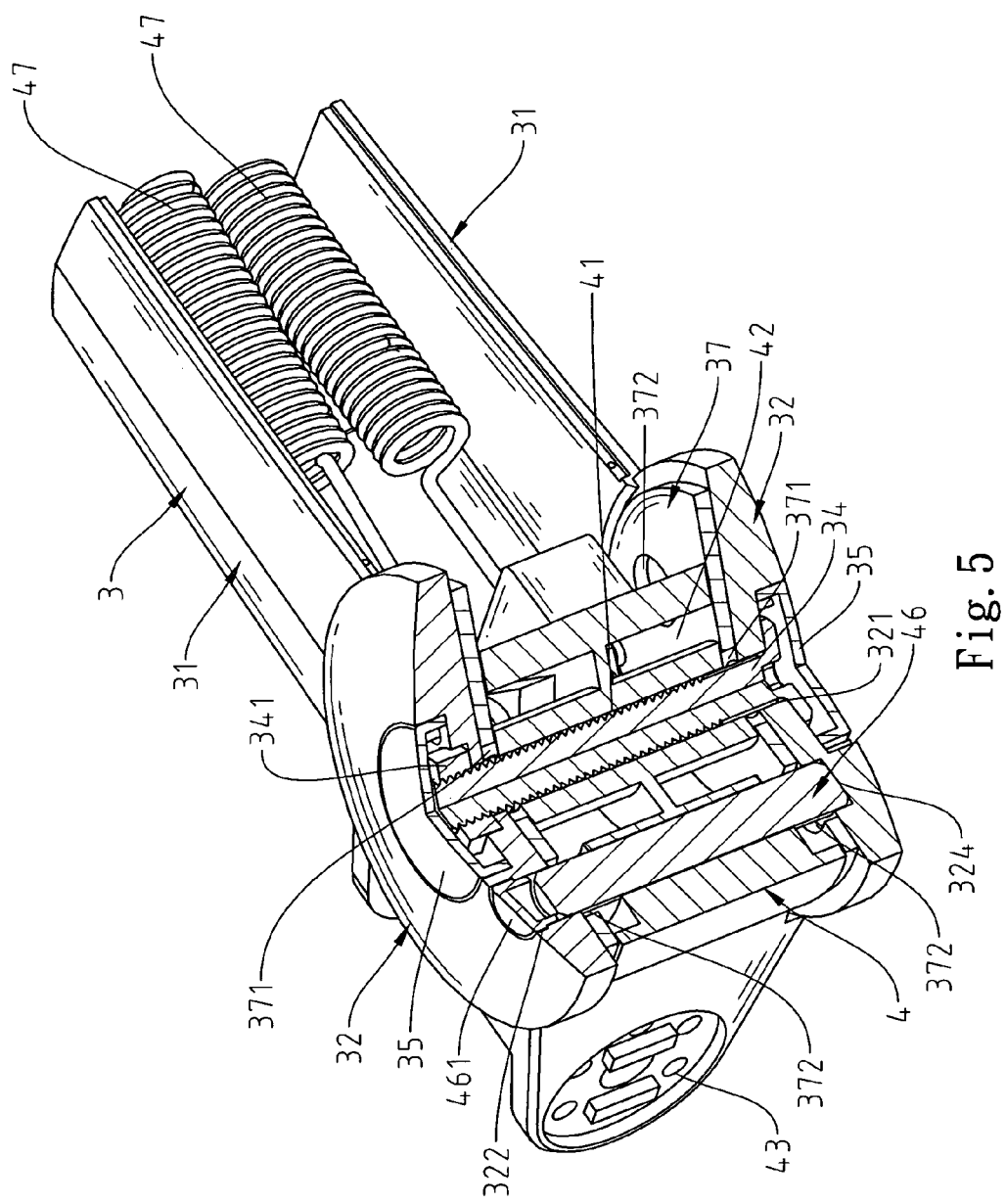
FIG. 5 is a second partially, perspective diagram showing the assembled pivotal connecting unit and support arm of the present invention.
Figure 6:
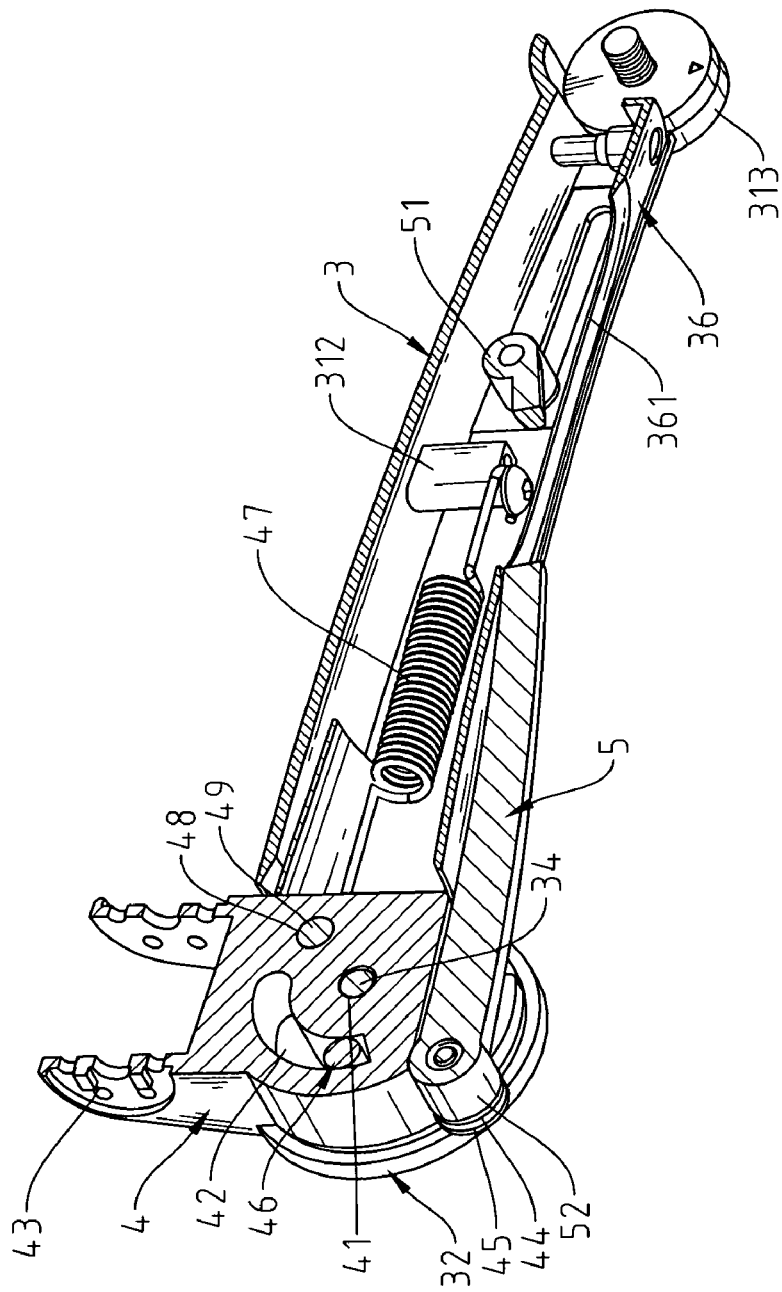
FIG. 6 is a perspective diagram showing the internal structure of the support arm of the present invention.
Figure 7:
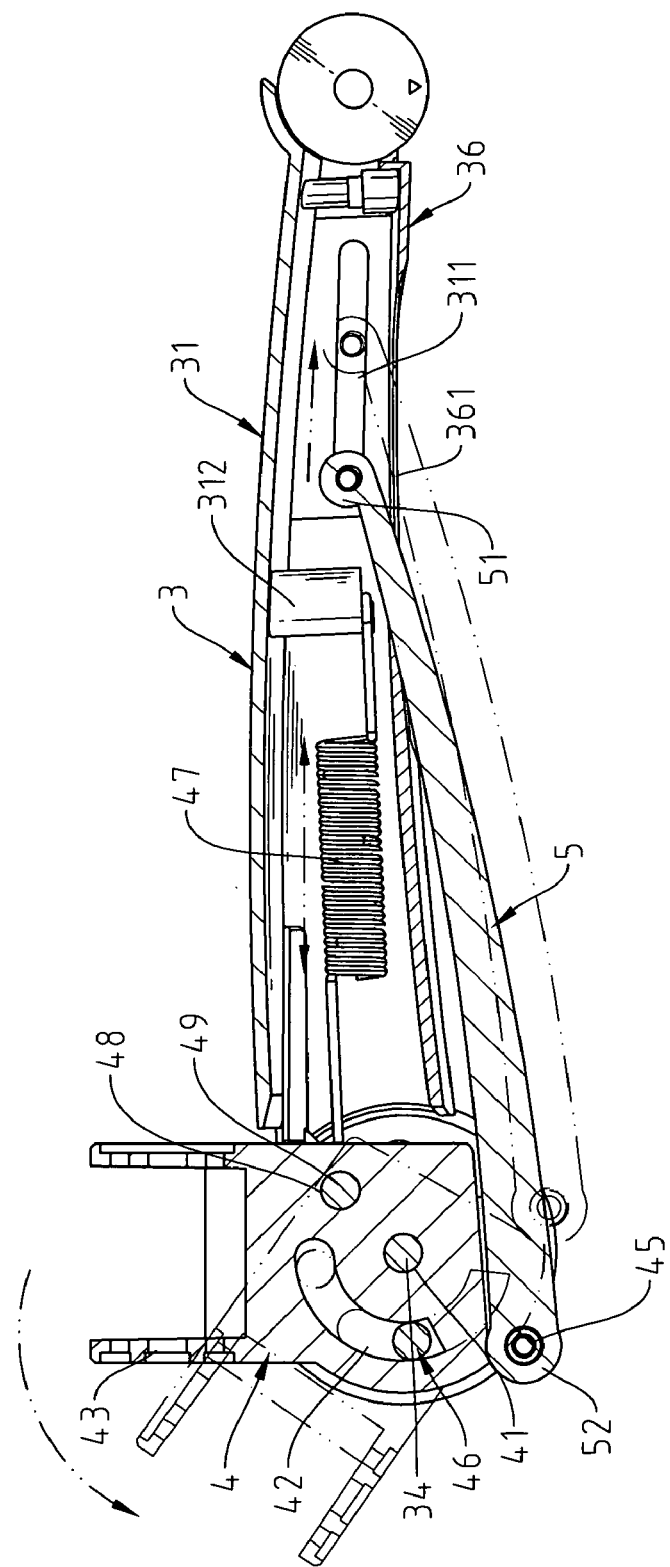
FIG. 7 is a schematic diagram showing the operation status of the linking rod of the present invention.
Figure 8:
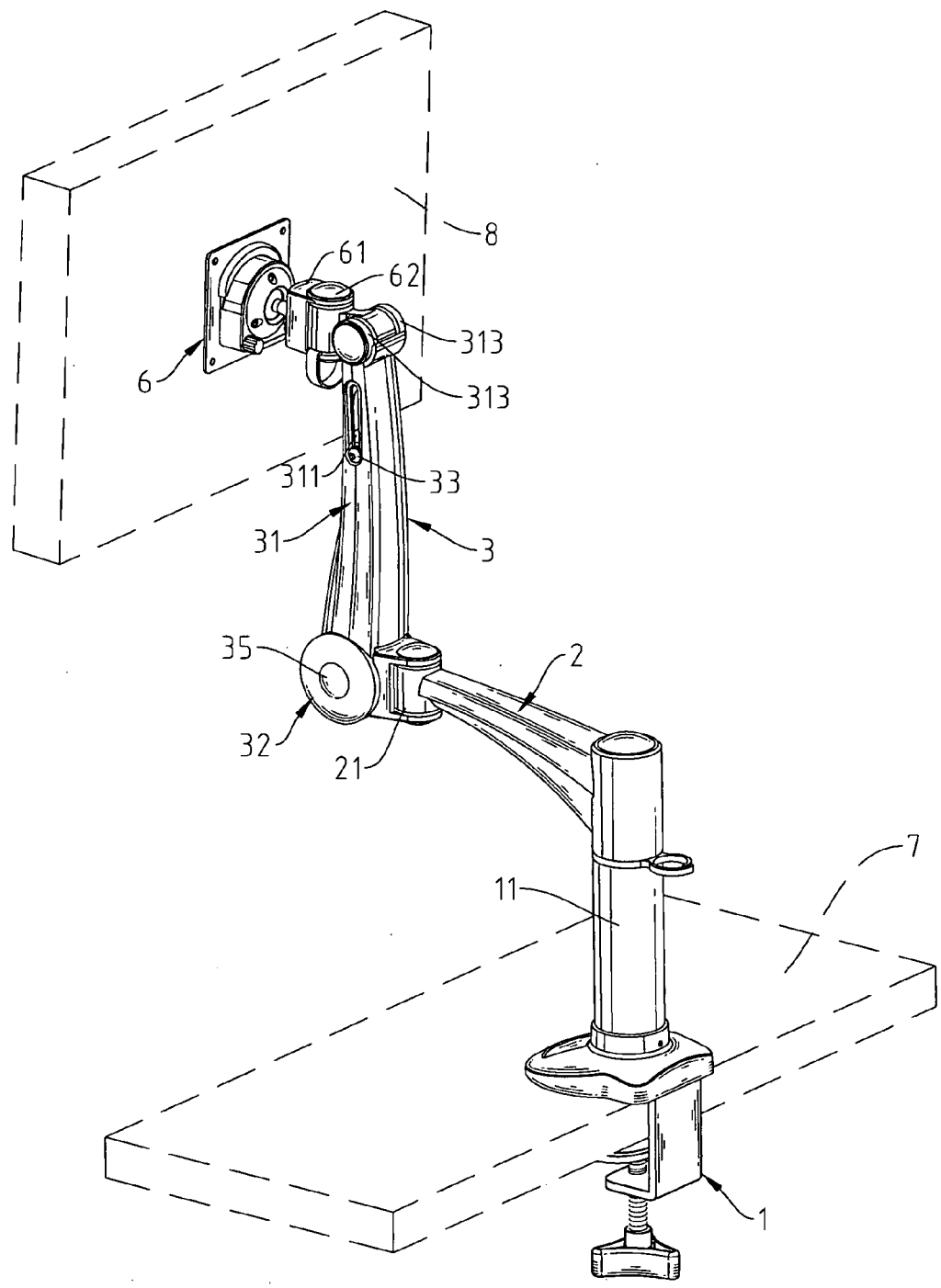
FIG. 8 is schematic diagram showing the utilization status of the present invention.

FIGS. 1 and 8 illustrate the assembled structure of the present invention. If there is a need to adjust the LCD monitor 8 to the optimum operation angle, as shown in FIGS. 2 and 7, the user can shift the support arm 3 upward or downward to adjust the tilt angle. Because the pivotal connecting unit 4 is pivotally fixed on the rotatable arm 2, the rotation of the clamping plates 32 of the support arm 3 including the friction devices 37 that couple thereto allows the movement of the shaft 46 in the guide slot 42. Therefore, the tilt angle of the support arm 3 is changed by the movement of the shaft 46. In addition, the linking rod 5 is upward or downward shiftable within a sliding slot 361 of the cover 36 such that the first shaft sleeve 51 of the linking rod 5 is shiftable within the long slots 311 of the support arm 3. Besides, the movement of the support arm 3 provides the elastic devices 47 with the elastic force, which pulls the support arm 3 downward for sharing the weight of the LCD monitor 8. After the adjustment is completed, the linking rod 5 can be tightly positioned by the screw assemblies 33 so as to provide the support arm 3 with the reliable tilt angle. Besides, the shiftable unit 6 that couples with the support arm 3 further allows the LCD monitor 8 to make the leftward and rightward movement.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

The invention claimed is:

1. A monitor support structure comprising:
a clamping unit, a rotatable arm, a support arm, a pivotal connecting unit, a linking rod, and a shiftable unit for holding and supporting an article, wherein:
said support arm comprises: two clamping plates bilaterally on the bottom thereof for coupling with said pivotal connecting unit; two lateral plates having symmetric long slots on the upper portions thereof; two fixing units closely under said long slots; a pair of clamping plates on the bottom thereof, one of said clamping plates having a center hole, a pin hole, and a plurality of positioning holes on the inner surface thereof, the other of said clamping plates having a center hole, a slotted hole, and a plurality of positioning holes; and a pair of friction devices disposed between said two clamping plates, each of said friction devices having a shaft hole, a pin hole, and a plurality of pins;
said pivotal connecting unit has a shaft hole, a penetrated guide slot for holding a shaft, a penetrated hole, and a pair of hooking ears on one side thereof, said cupping unit being assembled to said support arm, said pivotal connecting unit being coupled with first ends of a pair of elastic devices, said fixing units of said support arm being fixed on second ends of said elastic devices; and
said linking rod has a first shaft sleeve and a second shaft sleeve on both ends, respectively, said first shaft sleeve being pivotally located on said linking unit of said support arm, said second shaft sleeve being pivotally located on said pivotal connecting unit;
said friction devices being located respectively between said clamping plates and said pivotal connecting unit, said pivotal connecting unit, said clamping plates, and said friction devices being fixed together by a threaded rod that penetrates therethrough, said pin hole of said clamping plate, said pin holes of said friction devices, and said guide slot of said pivotal connecting unit being penetrated through by said shaft, one end of said shaft being held in said slotted hole such that when said support arm is shifted upward or downward to adjust the tilt angle, said shaft is driven by said clamping plates of said support arm and said friction devices to be shiftable within said guide slot, and said linking rod is also shiftable within said long slots of said support arm, wherein said linking rod can be positioned by screw assemblies for further positioning said support arm.

2. The monitor support structure of claim 1, wherein said support arm is a bar-shaped unit and has a chamber for orderly holding signal and power cables of said article.

3. The monitor support structure of claim 1, wherein said pivotal connecting unit has a pair of hooking ears on the rearward thereof for holding said second shaft sleeve, and said second shaft sleeve is fixed on said hooking ears by shaft assemblies.

4. The monitor support structure of claim 1, wherein said support arm is covered with a cover, and said cover has a sliding slot such that said linking rod is shiftable within said sliding slot.

5. The monitor support structure of claim 1, wherein said pins of said friction devices are inserted into said positioning holes of said clamping plates.

6. The monitor support structure of claim 1, wherein two elastic sheets are disposed between said long slots and said first shaft sleeve of said linking rod and, respectively.

* * * * *